US012808830B2

(12) United States Patent
Mansouri et al.

(10) Patent No.: US 12,808,830 B2
(45) Date of Patent: Nov. 24, 2026

(54) SOLID-STATE REFERENCE ELECTRODE

(71) Applicant: Instrumentation Laboratory Co., Bedford, MA (US)

(72) Inventors: Sohrab Mansouri, Sudbury, MA (US); Anahita Karimi, Westwood, MA (US)

(73) Assignee: Instrumentation Laboratory Co., Bedford, MA (US)

( * ) Notice: Subject to any disclaimer, the term of this patent is extended or adjusted under 35 U.S.C. 154(b) by 137 days.

(21) Appl. No.: 18/390,317

(22) Filed: Dec. 20, 2023

(65) Prior Publication Data

US 2025/0208082 A1 Jun. 26, 2025

(51) Int. Cl.
*G01N 27/30* (2006.01)
*G01N 27/403* (2006.01)

(52) U.S. Cl.
CPC ......... *G01N 27/301* (2013.01); *G01N 27/302* (2013.01); *G01N 27/4035* (2013.01)

(58) Field of Classification Search
CPC . G01N 27/301; G01N 27/302; G01N 27/4035
See application file for complete search history.

(56) References Cited

U.S. PATENT DOCUMENTS 6,872,297 B2 * 3/2005 Mansouri ............. G01N 33/492 205/793
9,658,181 B2 5/2017 Balasubramanian et al.
2001/0025790 A1 10/2001 Thrier et al.
2010/0252428 A1 10/2010 Lauks et al.
2024/0183817 A1 6/2024 Cooley et al.

FOREIGN PATENT DOCUMENTS

EP 4336177 A1 3/2024
WO WO 1992006370 4/1992
WO WO 2009082187 A2 * 7/2009 ............. G01N 27/30

OTHER PUBLICATIONS

Lauroyl/myristoyl methyl glucamide entry in the U.S. Department of Health & Human Services, National Institutes of Health, GSRS (Global Substance Registration System) website, 2025, https://gsrs.ncats.nih.gov/ginas/app/ui/substances/SC667B999P (Year: 2025).*
Entropy Resins, ".Basics of Epoxy" (hereafter "Entropy Resins"), downloaded from https://entropyresins.com/how-to/resin-and-hardener-basic-instructions/#:~:text=As%20it%20cures%2C%20epoxy%20passes,when%20the%20epoxy%20is%20cooler. (Year: 2025).*
(Continued)

*Primary Examiner* — Alexander S Noguerola
(74) *Attorney, Agent, or Firm* — ARENTFOX SCHIFF LLP

(57) ABSTRACT

A solid-state reference electrode configured to provide a reference potential in an electrochemical analyzer. The solid-state reference electrode includes a conductor element comprising a metal and a coating comprising a solid salt of the metal; and a solid-state polymeric composition disposed in contact with the conductor element. The solid-state polymeric composition includes a solidified mix of a cured resin, a salt that produces substantially equitransferent ions, and a polyol that facilitates ionic conductivity within the solid-state polymeric composition.

20 Claims, 7 Drawing Sheets

(56) References Cited

OTHER PUBLICATIONS

Jordan Smith, "Construction Materials—What Is Cyanoacrylate (Super Glue) and How Does It Work? ", online article, M.T. Copeland Technologies, Dec. 20, 2020, https://mtcopeland.com/blog/what-is-cyanoacrylate-super-glue-and-how-does-it-work/ (Year: 2020).*
Jan et al., "Role of Surface Electric Charge in Red Blood Cell Interactions," The Journal of General Physiology • vol. 6i, I973 pp. 638-654 (Year: 1973).*
Leung et al., "Effect and Prevention of Trace Ag+ Contamination from Ag/AgCl Reference Electrodes on CO2 Reduction Product Distributions at Polycrystalline Copper Electrodes," ACS Appl. Energy Mater. 2019, 2, 8283-8293 (Year: 2019).*
Dow® Tergitol™ 15-S-9 Properties sheet 2025 (Year: 2025).*
Bae et al., "Electrochemical Sensing Platform Integrated with Solid-state Reference Electrode Based on Indium Tin Oxide Interdigitated Array Electrodes," Electroanalysis, May 2023, 35(5):1-8.
Criscuolo et al., "All-solid-state Reference Electrodes for analytical applications," Presented at the Proceedings of the IEEE 8th International Workshop on Advances in Sensors and Interfaces, Otranto, Apulia, Italy, Jun. 13-14, 2019, 4 pages.
Gao et al., "A Solid-State Reference Electrode Based on a Self-Referencing Pulstrode," Angewandte Chemie International Edition, Feb. 2020, 59(6):18 pages.
Guinovart et al., "A reference electrode based on polyvinyl butyral (PVB) polymer for decentralized chemical measurements," Analytica Chimica Acta, Apr. 2014, 821:1-34.
Macedo et al., "An unusually stable solid state Ag|AgCl reference electrode for long term continuous measurements based on a crosslinked poly(vinyl acetate)/KCl composite," Electrochimica Acta, Feb. 2021, 368:1-9 pages.
Mousavi et al., "An analytical quality solid-state composite reference electrode," Analyst, Jun. 2013, 138(18):5216-5220.
Moya et al., "Stable Full-Inkjet-Printed Solid-State Ag/AgCl Reference Electrode," Analytical Chemistry, Nov. 2019, 91(24):15539-15546.
Vonau et al., "An all-solid-state reference electrode," Sensors and Actuators B: Chemical, Feb. 2010, 144(7):368-373.
Extended European Search Report in European Appln. No. 24218896.9, mailed on May 8, 2025, 8 pages.
Search Report in Luxembourg Patent Appln. No. 103237, mailed on Aug. 12, 2024, 12 pages (with English Translation).
Rowe et al., "Handbook of Pharmaceutical Excipients", Sixth Edition, Pharmaceutical Press and American Pharmacists Association, 2009, 5 pages.
Chen et al., "Reference Electrodes Based on Ionic Liquid-Doped Reference Membranes with Biocompatible Silicone Matrixes", American Chemical Society, vol. 5, Issue 6, May 5, 2020, 9 pages.
Collins, S.D., "Practical limits for solid-state reference electrodes", Sensors and Actuators B, vol. 10, 1993, pp. 169-178.
Guinovart et al., "A reference electrode based on polyvinyl butyral (PVB) polymer for decentralized chemical measurements", Analytica Chimica Acta, vol. 821, 2014, pp. 72-80.
Kelani et al., "Innovative polymer-based, miniaturized solid-state reference electrode: A sustainable solution for potentiometric and electrochemical power sources", Journal of Power Sources, Article No. 236945, vol. 642, 2025, pp. 1-13.
Kuczak et al., "Recent advances in all-solid-state reference electrodes: A review", Analytica Chimica Acta, Article No. 344473, vol. 1378, 2025, pp. 1-15.
Lai et al., "Experimental investigation into geometry-dependent practical behavior of all-solid-state reference electrodes", Ionics, vol. 31, 2025, pp. 4455-4468.
Mousavi et al., "An analytical quality solid-state composite reference electrode", Analyst, vol. 138, 2013, pp. 5216-5220.
Tran et al., "Stable planar solid reservoir reference electrode", Electrochimica Acta, Article No. 146816, vol. 538, 2025, pp. 1-7.

* cited by examiner

SOLID-STATE REFERENCE ELECTRODE

TECHNICAL FIELD

The present disclosure relates to solid-state reference electrode.

BACKGROUND

Reference electrodes are important components of electrochemical sensing devices where they are used to provide stable, precise, and reproducible reference potentials needed for analyzing fluid samples such as blood, plasma, or aqueous samples. Liquid electrolytes—which have long been used in such reference electrodes—require elaborate setups and often suffer from issues such as leakage, evaporation etc. Solid-state reference electrodes—which use solid materials such as polymers to replace the liquid electrolytes in conventional reference electrodes—have been considered to allow for position-independence, mechanical robustness, case of fabrication, miniaturization, integration with other electrochemical components, and increased robustness against sample contamination as compared to liquid electrolytes.

SUMMARY

In one aspect, this document features a solid-state reference electrode configured to provide a reference potential in an electrochemical analyzer. The solid-state reference electrode includes a conductor element comprising a metal and a coating comprising a solid salt of the metal; and a solid-state polymeric composition disposed in contact with the conductor element. The solid-state polymeric composition includes a solidified mix of a cured resin, a salt that produces substantially equitransferent ions, and a polyol that facilitates ionic conductivity within the solid-state polymeric composition.

In another aspect, this document features a module for an electrochemical analyzer, the module including a flow path configured to receive a fluid sample, a solid-state reference electrode that includes a reservoir within which a solid-state polymeric composition is disposed, and a junction structure disposed between the reservoir and the flow path. The solid-state polymeric composition includes a cured resin, a salt that produces substantially equitransferent ions, and a polyol that facilitates ionic conductivity within the solid-state polymeric composition. A shape of the junction structure is configured to (i) allow the fluid sample in the sample input port to come in contact with the solid-state polymeric composition and (ii) facilitate a substantially constant ion flux between the fluid sample and the solid-state polymeric composition.

In another aspect, this document features a method for fabricating a solid-state reference electrode for an electrochemical analyzer. The method includes forming a fluid composition of (i) a cured resin pre-cursor, (ii) a salt that produces substantially equitransferent ions, and (iii) a polyol. The method also includes depositing the fluid composition into a reservoir configured to house the solid-state reference electrode, and curing the fluid composition.

In another aspect, this document features a method for analyzing fluid samples, the method including receiving a fluid sample within an electrochemical measurement device, and contacting the fluid sample by a solid-state reference electrode for the electrochemical measurement device at a junction structure. The junction structure is disposed between (i) a flow path of the fluid sample and (ii) a reservoir housing a solid-state polymeric composition configured to support the solid-state reference electrode. The solid-state polymeric composition is configured to provide a substantially constant ionic flux of substantially equitransferent ions through the junction structure. The method also includes measuring one or more analytes in the fluid sample using one or more sensors of the electrochemical measurement device, wherein the measuring is performed based on a reference potential provided by the solid-state reference electrode at the junction structure. The solid-state polymeric composite composition includes a solidified mix of: a cured resin, a salt that produces the substantially equitransferent ions, and a polyol that facilitates the substantially constant ionic flux within the solid-state polymeric composition.

Various implementations of the above aspects can include one or more of the following.

The solidified mix can include a non-ionic surfactant material. The cured resin can include a polyacrylate. The salt can include potassium chloride (KCl). The solidified mix can include a secondary salt that reduces effects of erythrocytes on a junction potential between the solid-state reference electrode and a sample in the electrochemical analyzer. The secondary salt can be an equitransferent salt of sodium comprising at least one of: sodium acetate, sodium bicarbonate, or sodium formate. The polyol can be a triol compound. The triol compound can include glycerol. The non-ionic surfactant material can include lauroyl/myristoyl methyl glucamide. The solid-state polymeric composition can include 45-65% of the cured resin, 30-55% of the salt, 1-4% of the polyol, and 0.2-2% of the non-ionic surfactant material. The metal can be silver (Ag). The solid salt of the metal can be silver chloride (AgCl).

The reservoir can have an ellipsoid shape to facilitate the substantially constant ion flux between the fluid sample and the solid-state polymeric composition. The junction structure can include a first opening at an interface of the reservoir and the junction structure, and a second opening at an interface of the flow path and the junction structure. A size of the first opening can be larger than a size of the second opening, and the junction structure can have a funnel shape. The module can include one or more sensors disposed in the flow path to measure one or more analytes in the fluid sample.

In some implementations, the solid-state reference electrodes described herein can provide one or more of the following advantages. By providing for a carefully tailored selection/composition of polymer, equitransferent salts and other additives such as triols, the technology described herein facilitates implementation of solid-state reference electrodes that have fast start-up times, substantially constant ionic flux of equitransferent ions that results in stable reference potentials, and significantly long use life. Additives such as non-ionic surfactants provide for homogeneity of the mixture, making the reference electrodes easily reproducible, and thus, potentially widely usable in a wide variety of electrochemical measuring systems. In addition, specific configurations of the reference electrode chamber and the junction at which the reference electrode contacts a sample result in adequate and substantially stable ionic flux between the electrode and the sample allowing a stable reference potential throughout the use-life of the reference electrode.

Some or all of the aspects may be methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
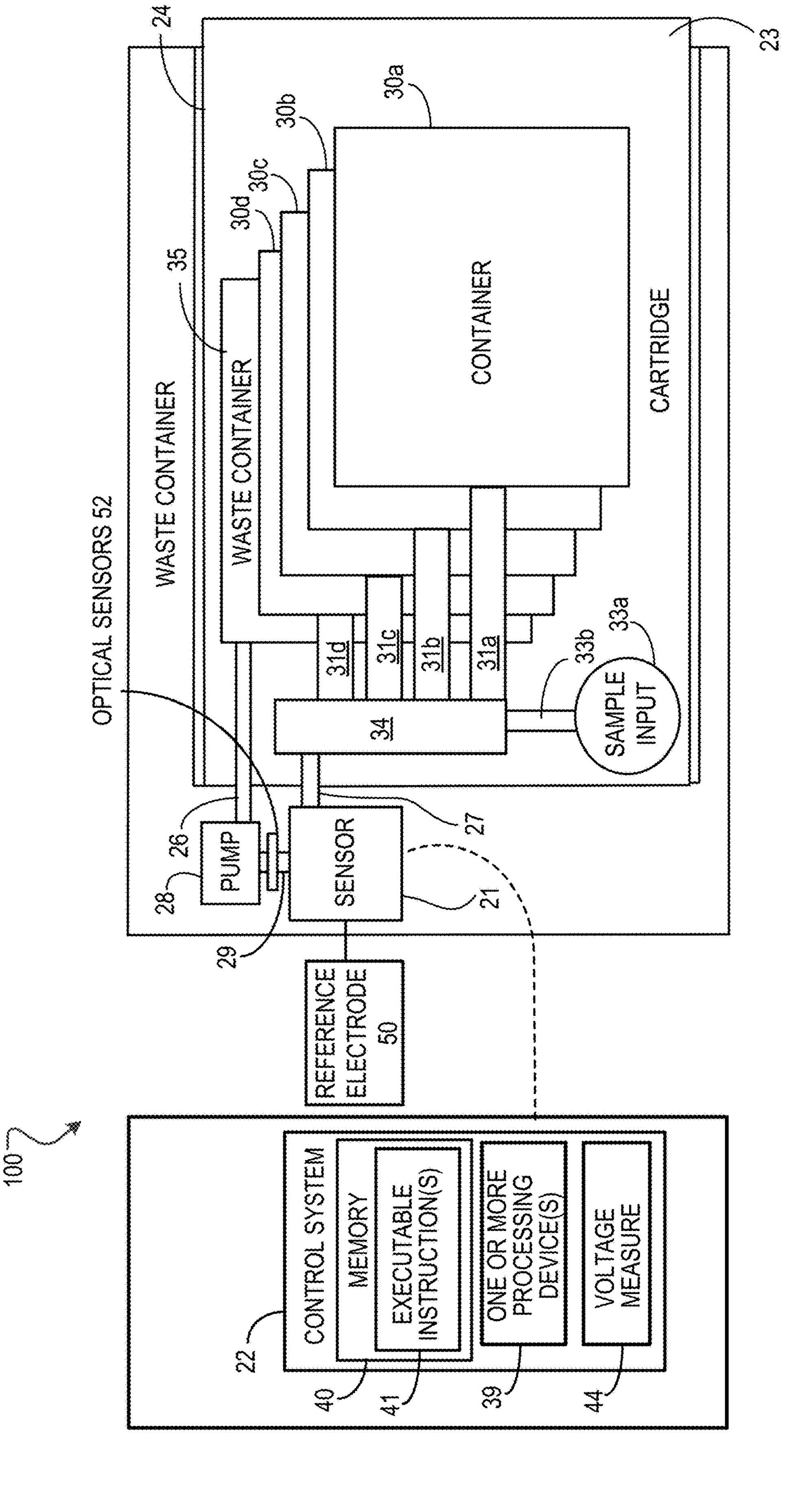
FIG. 1 illustrates an example system in which the solid-state reference electrodes described herein can be used.

This specification relates to solid-state reference electrodes for use in various electrochemical measuring systems. Solid-state reference electrodes described herein exhibit significantly longer use life (e.g., a month or more-even for continuous use) as compared to other solid-state reference electrodes being used in the industry. For intermittent use (e.g., where a discrete number of samples are analyzed per day), the use life is significantly more than a month. The disclosed reference electrodes also exhibit stable junction potential across different fluid samples, as well as low hydration time (i.e., the time taken by a reference electrode to reach a steady ionic communication with a sample after which the reference electrode reliably provides a stable reference potential). Further, due to the compositional simplicity, the solid-state reference electrodes described herein are easily reproducible, making them potentially widely usable in improving reliability and cost-effectiveness of various electrochemical measuring systems. In addition, this document also discusses specific configurations of the reference electrode chamber and the junction at which the reference electrode contacts a sample. Specifically, the disclosed configurations of the chamber and the junction result in adequate and substantially stable ion flux between the electrode and the sample through the junction providing a stable junction potential throughout the use-life of the reference electrode.

Conventional reference electrodes operate based on liquid electrolytes and can include Ag/AgCl half cells that are connected to the sample through a salt bridge containing an aqueous solution of an equitransferent salt, such as KCl. Such conventional reference electrodes can provide fast starts and long use-life, but typically have complex designs that are not conducive to miniaturization. Other approaches use a flow-through Ag/Ag+ reference electrode where a low level of silver ion (typically 1 mmole of AgNO3) mixed with a high concentration of equitransferent salt (typically 1 mole of KNO3) forms a liquid flow junction. Such electrodes are typically of large size and complex design and are often plagued by contamination of the sample with the reference solution electrolytes. In general, liquid electrolyte reference electrodes can encounter various issues such as leakage, evaporation, sensitivity to temperature and pressure variations, and biofouling.

Solid state reference electrodes—designed to address drawbacks associated with liquid electrolyte reference electrodes—use solid materials such as polymers, agar, or polymeric membranes as the source of ions. Solid-state reference electrodes allow for position-independence, mechanical robustness, case of fabrication, miniaturization, and integration with other electrochemical components, and are robust to sample contamination. However, solid-state reference electrodes have their own challenges such as long hydration time, interfacial or junction potential instability, and limited lifetime. While some presently available reference electrodes do exhibit fast hydration, that comes at a cost of short use-lives (single-use, in some cases). Due to these drawbacks, solid-state reference electrodes—in spite of their advantages over liquid electrolyte electrodes—have not yet found widespread applications in electrochemical measuring systems.

The technology described herein provides for a solid-state reference electrode that potentially addresses some of the above-mentioned drawbacks of solid-state reference electrodes. Specifically, this document describes a solid-state reference electrode that includes a silver/silver chloride electrode in a housing that contains an inert photo-cured polymer matrix (e.g., formed using an acrylate ester monomer that is curable/polymerized using ultraviolet light) and salt powder dispersed within the matrix that generates equitransferent ions. Additional additives are included in the polymeric matrix to provide specific functionalities. For example, one or more polyols (e.g., triol compounds such as glycerol) are added to allow for target ionic conductivity in the cured polymer material, which in turn results in fast start-up. Non-ionic surfactants (e.g., lauroyl/myristoyl methyl glucamide) are included in the polymer/salt mixture to maintain homogeneity that is germane to reproducibility.

In addition, the chamber or reservoir in which the solid-state reference electrode is housed, and/or the junction or interface through which the electrode in the reservoir contacts a sample are specifically configured for particular target functionalities—e.g., to maintain constant ion flux from the cured polymer/salt mixture through the junction into the sample, which in turn maintains the junction potential stability throughout the use-life of the electrode. In some examples, the reservoir that holds the polymer/salt mixture can have circular or semi-oval configuration and a funnel-shaped junction structure to contact a sample. Such a configuration can allow for a substantially constant ion flux through the junction structure and thus provide stable junction potential for at least one-month use-life of the disclosed solid-state reference electrode.

In some examples, the disclosed solid-state reference electrode can be imbedded in a sensor card that houses sensors for analyzing fluid samples, and can replace the reference liquid flow path, the reference solution inlet, the reference solution bag, and the reference pump winding in a liquid flow junction reference electrode.

FIG. 1 illustrates an example system 100 for analyzing fluid samples. The system 100 includes an analyzer 20 (also referred to herein as an electrochemical measurement device) that is configured to receive an example cartridge 23 that includes one or more containers 30*a* to 30*d* (30, in general), corresponding ducts 31*a* to 31*d* (31, in general), sample input 33*a* and corresponding duct 33*b*, distribution valve 34, and waster container 35. Cartridge 23 is movable into, and out of the analyzer 20 via a corresponding slot 24 disposed on the analyzer 20. The cartridge 23 may be a multi-use, disposable cartridge in some implementations.

In some implementations, the cartridge 23 includes the multiple containers 30. Although four containers 30*a*-30*d* are shown FIG. 1, the cartridge 23 may contain fewer than four containers—for example, one, two, or three containers—or more than four containers—for example, five, six, seven, eight, and so forth containers. In some implementations, the containers 30 may be sealed bags or pouches. The bags or pouches may be made of foil laminate, soft plastic, rubber, of any other type of soft liquid-tight material. In some implementations, the containers 30 may be made of hard plastic, glass, or any other type of hard liquid-tight material. The containers 30 may be single-use containers or multi-use containers. In some implementations, the different containers 30 may hold compositions having different reagents used in analyzing the fluid samples. In some implementations, the different ones of the containers 30 may hold compositions having different concentrations of the same reagents.

In some implementations, the cartridge 23 includes ducts 31 that are fluidically connectable to the flow channel of sensor 21 via the duct 27. Ducts 31*a* to 31*d* are configured and arranged to transport compositions from respective containers 30*a* to 30*d*. Ducts 31 can include plastic tubing within the cartridge or channels formed in a structure of the cartridge, for example. In some implementations, negative pressure/suction can be applied to move composition from a respective container 30 into a respective duct 31 and ultimately to sensor 21. To this end, in some implementations, the system 100 can include a pump 28 for introducing the suction to the ducts 31 via duct 29, sensor 21, duct 27, and distribution valve 34.

The Distribution valve 34 is in fluid communication with ducts 31 and in fluid communication with sensor 21 via duct 27. In some implementations, the distribution valve 34 is controllable by the control system 22 to selectively apply pressure from pump 28 to the ducts 31 move compositions from the respective containers 30 into the flow channel of the sensor 21.

The sensors 21 can include sensors of various types that are configured to sense the presence of various analytes. In some implementations, the sensors 21 can include one or more sensors configured to sense one or more of the following analytes in whole blood or plasma: creatine, creatinine, glucose, lactate, $pCO_2$, pH, potassium, sodium, calcium, chloride, $PO_2$, and hematocrit. In some implementations, the sensors 21 can include one or more hemolysis sensors. In some implementations, the sensors 21 can be similar to the sensors described in U.S. Pat. No. 9,658,181, the contents of which are incorporated herein by reference. In some implementations, one or more optical sensors 52 can be disposed within the electrochemical measurement device 23 to make optical measurements on the fluid traversing through the device. While the example of FIG. 1 shows the optical sensors to be associated with the flow-path 29, the optical sensors can be deployed at another location on the electrochemical measurement device, such as on the sensor flow-path 27 or the waste flow-path 26.

In some implementations, the cartridge 23 includes a sample input 33*a*. Sample input 33*a* is configured to receive a test sample—e.g., blood, plasma, or another aqueous sample—that is to be analyzed by the analyzer 20. For example, sample input 33*a* may be a self-scaling port or other structure to which a pipette or needle may be inserted to inject test sample into the cartridge. In some implementations, sample input 33*a* is fluidically connected to duct 33*b* which may be fluidically connected to the flow channel of sensor 21 via distribution valve 34 and duct 27. Suction and control over the distribution valve can moves the test sample to the sensor 21.

In some implementations, the cartridge 23 includes a waste container 35 in fluid communication with pump 28 via duct 26. Pump 28 is controllable by control system 22 to move content from the fluid channel of sensor 21 into waste container 35 following use of the content.

The control system 22 may include one or more processing devices 39, examples of which are described herein. The control system 22 also includes memory 40 storing instructions 41 that are executable to control various operations of clinical analyzer 20, such as opening and/or closing distribution valve 34 to move composition or test sample to sensor 21, and to perform the various operations described herein. In this example, the control system 22 is shown as a component that is in local communication with the analyzer 20. In some examples, the control system 22, or portions thereof, may be external to the clinical analyzer 20. In some examples the control system 22 may be distributed across multiple hardware platforms. In some examples the control system 22 may be partly embedded in the clinical analyzer and partially distributed across one or more external hardware platforms.

In some implementations, the control system 22 includes a voltage measurer 44. For example, the voltage measurer 44 may be a hardware device, such as a potentiometer. The hardware device may be electrically connected to the conductor of sensor 21 to measure the voltage on the conductor. The hardware device can be configured to obtain a signal output that is readable by the one or more processing devices 39 to obtain voltage measurements, which in turn may be used to identify an analyte. The voltage measurements can be made with respect to a reference electrode 50 connected to a portion of the fluid path (e.g., at a portion of the sensor flow-path 27 or the sample input port 33*a*). While the example of FIG. 1 shows the voltage measurer 44 as part of the control system 22, in some implementations, the voltage measurer 44 may reside outside the control system 22. In some implementations, the voltage measurer may be disposed within the clinical analyzer 20. In some implementations, the clinical analyzer includes a display device. The control system 22 can be configured to output test results to a user interface (UI), such as a graphical UI, on the display device.

A solid-state reference electrode in accordance with technology described in this document can be used as the reference electrode 50. In some implementations, reference electrode 50 can be a solid-state reference electrode that includes a conductor element made of a metal and a coating that includes a solid salt of the metal. For example, the conductor element can be silver, and the solid salt of the metal can be silver chloride. The conductor element can be disposed in contact with a solid-state polymeric composition that includes a solidified mix of (i) a polymer that is polymerizable thermally or exhibits change in structural property upon exposure to at least a portion of the electromagnetic spectrum, and (ii) a primary salt powder (e.g., potassium chloride (KCl)) that produces substantially equitransferent ions. In some implementations, the polymer can be acrylate ester, which changes from fluid state to solid-state upon being exposed to the ultraviolet (UV) portion of the spectrum. Other examples of the polymer can include epoxy, polyurethanes, polyesters, polyimides, amino reins, silicones, or other polymers that do not release ions. Conductivity through the polymeric composition is supported by mobility of ions—cations and anions—flowing in opposite directions, and together supporting an electric current flow. The ion movement, which represents ionic conductivity, collectively sustains the flow of electric current. If the fraction of the electric current carried by the cations substantially equals the fraction carried by the anions, the ions are said to be equitransferent. Equitransferent salt is necessary for reference electrodes because it helps to minimize the diffusion potential at the junction between the reference electrode and the test solution that allows for a stable and reproducible reference potential. While KCl is described as an example, other equitransferent salts such as rubidium chloride (RbCl) or Cesium Chloride (CsCl) may also be used.

In some implementations, one or more polyols can be mixed with the polymeric composition to facilitate ionic conductivity that results in a fast start-up of the electrode 50. In some implementations the polyol is a small molecule (e.g., having a molecular weight less than about 1000 g/mol, less than about 500 g/mol). In some implementations, the polyol has a molecular weight greater than about 70 g/mol. In some implementations the polyol has a boiling point greater than 200° C. at STP. For example, in some implementations a triol compound (e.g., glycerol) can be added—e.g., at 1%-4% ratio by weight to the salt mixture underlying the solid-state polymeric composition—to facilitate a fast start-up and stable equitransferent ionic conductivity throughout the use-life of the electrode. In some implementations, other humectant polyols such as ethylene glycol, propylene glycol, or sorbitol may be added to the polymeric composition to support the ionic conductivity in the electrode 50. The choice of polyol is informed in part by the observation that volatile alcohols like methanol and ethanol do not last in the polymer compositions over long durations of shelf life, thereby causing variability in the ionic conductivity throughout the polymer compositions—particularly around the junction area where sample comes in contact with the reference. Polyols with high boiling points (e.g., glycerol with a boiling point of over 500° F.) provides a stable performance throughout the shelf life.

In some implementations, the polymeric composition can also include a secondary salt powder, for example, an equitransferent salt of sodium such as sodium acetate, sodium bicarbonate, or sodium formate. In some implementations, the secondary salt is added to reduce the effect of erythrocytes on the junction potential of solid-state reference electrode 50. In some implementations, the polymeric composition can include 50-60% of the polymer, 35-45% of the primary salt and less than 5% of the secondary salt.

In some implementations, the polymeric composition can include a non-ionic surfactant (e.g., lauroyl/myristoyl methyl glucamide) to maintain homogeneity of the mixture and making the polymer composition reproducible for mass production. Non-ionic surfactants can enhance wetting properties, ensuring better contact between the solid-state electrode and the sample solution. Improved wetting can lead to more reliable and stable electrode potentials.

The incorporation of a non-ionic surfactant into the composition of a solid-state reference electrode offers multifaceted benefits. Notably, resistance to biofouling, making it particularly advantageous in applications involving biological samples like whole blood. Additionally, the surfactant serves as an effective bubble suppressor, preventing the adhesion of bubbles on the junction surface and ensuring smoother ion transport for more reliable measurements. Furthermore, the non-ionic surfactant facilitate reproducible flux of ions through the electrode junction, thereby improving precision of potential measurements. In summary, the non-ionic surfactant enhances stability, reliability, and performance across various aspects of the solid-state reference electrode. For example, adding the non-ionic surfactant in a proportion of between 0.2% to 2% of the polymeric composition was found to be effective is maintaining homogeneity of the mixture of the polymer and the primary salt—which in turn resulted in good reproducibility of the junction potential of the solid-state reference electrode 50.

Figure 2:
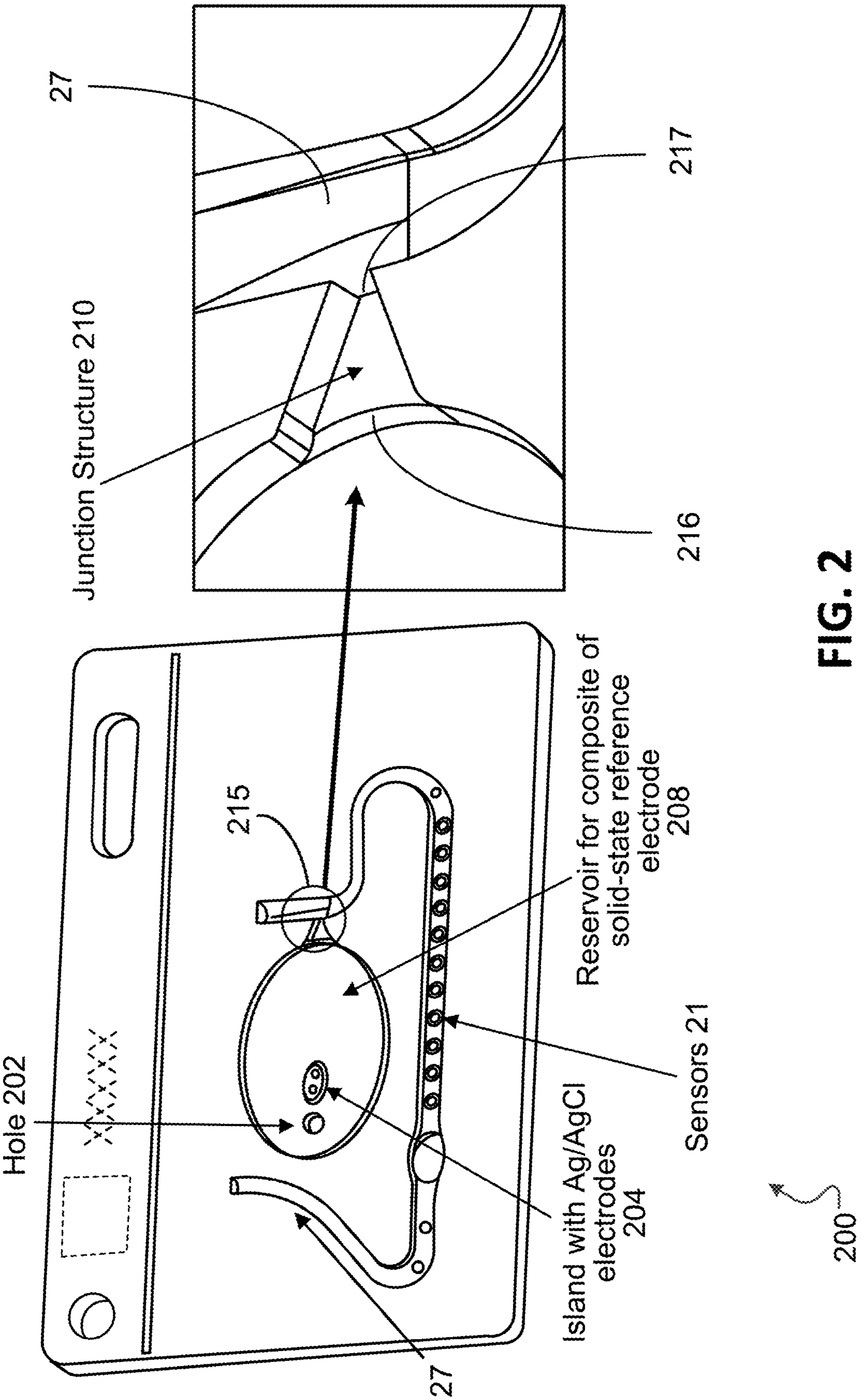
FIG. 2 illustrates an example of a module that includes portions of the system described with reference to FIG. 1.

In some implementations, the reference electrode—together with at least a portion of the sensor flow-path 27—can be provided in a separate module or housing that can be removably attached to the electrochemical measurement device 23. In some implementations, the one or more sensors 21 can also be disposed within a portion of the sensor flow-path such that the reference electrode 50, sensor flow-path 27, and the one or more sensors together forms a separate module (e.g., a sensor card). An example of such a module 200 is shown in FIG. 2. The module 200 includes at least a portion of the sensor flow-path 27, and a reservoir 208 for housing the polymeric composition for the solid-state reference electrode 50. In some implementations, the reservoir 208 has an elliptical shape, as illustrated in FIG. 2. In some implementations, the reservoir 208 can be an ellipsoid, or have a circular or another shape that facilitates a substantially constant ionic flux between the polymeric composition housed within the reservoir and the portion of the sensor flow-path 27 to which the reservoir 208 is connected. In the particular example of FIG. 2, the reservoir 208 is elliptical shaped, having a minor axis of 9 mm, a major axis of 12 mm, and a substantially constant depth of 0.6 mm. In one particular implementation, an ellipsoid-shaped junction with a volume of 43 cubic millimeters was found to extend the stability of use life beyond 40 days.

The reservoir is connected to a portion of the sensor flow-path 27 via a junction structure 210 illustrated within the blow-up of the portion 215. In this example, the junction structure 210 is a funnel-shaped structure that connects the reservoir 208 with a portion of the sensor flow-path 27. The cross-section of the opening at the interface 216 between the reservoir 208 and the junction structure 210 is typically larger as compared to the cross-section of the opening at the interface 217 of the junction structure 208 and the sensor flow-path 27. For example, the width of the opening at the interface 217 can be 0.3-0.4 mm. In some implementations, a circular, semi-circular, or semi-oval configuration with diameter around 12 mm and depth around 0.6 mm can be used for the reservoir 208—together with a funnel-shaped junction structure 210 to allow for a substantially constant ion flux through the junction structure 210 and a stable junction potential for an extended period of use-life of solid-state reference electrode 50. Module 200 is covered by a clear adhesive tape to seal and form the flow path 27 and solid-state reference reservoir 208. Module 200 could be covered by an additional metal backing with adhesive after curing of the polymeric composition in reservoir 208 to facilitate thermostatic heating of module 200 during sample measurements.

In some cases, this configuration can provide at least one month of use-life for the reference electrode.

Figure 3:
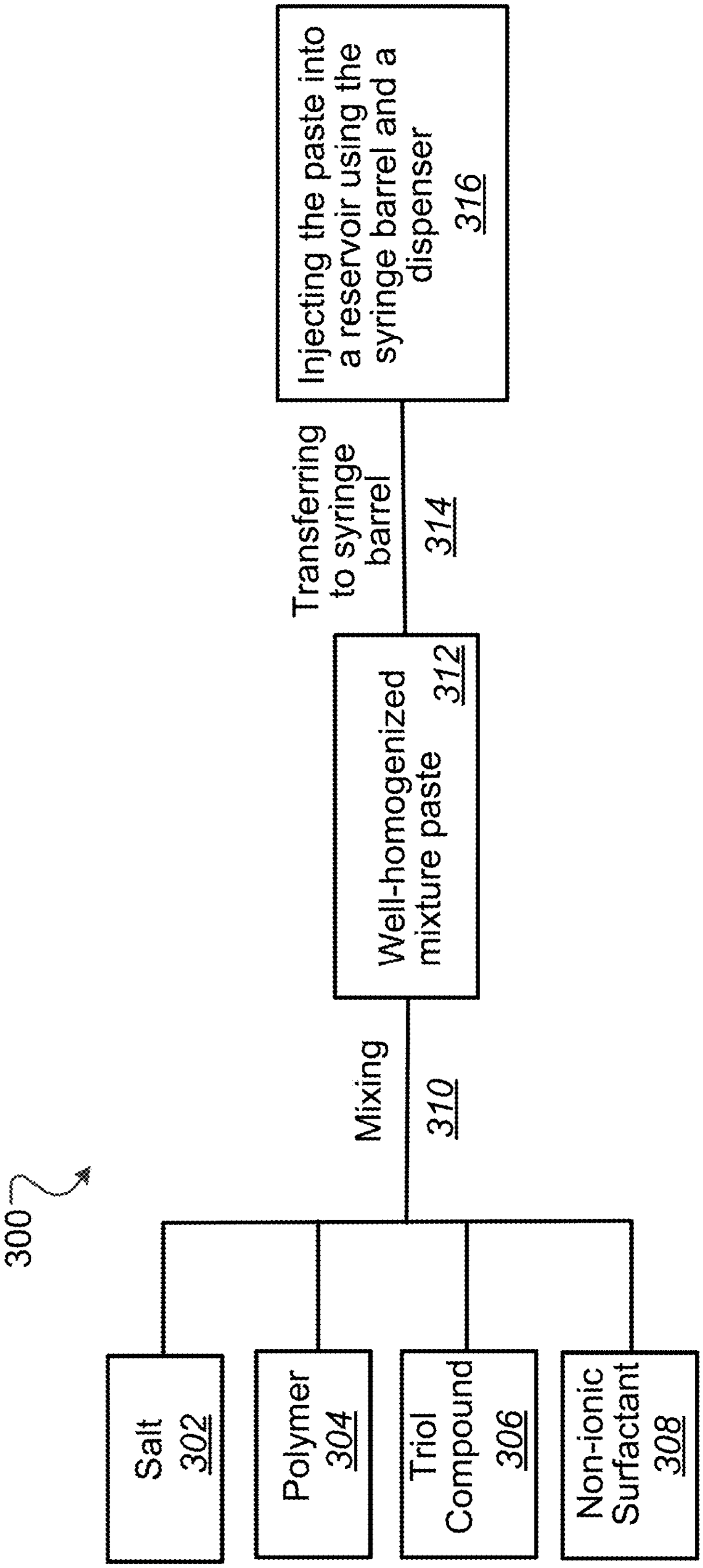
FIG. 3 illustrates a flow chart of an example fabrication process for the solid-state reference electrodes described herein.

The module 200 also includes a hole or other opening 202 that allows for a fluid polymer composition to be injected into the reservoir 208 at the time of fabrication. In some implementations, the polymeric composition of the solid-state reference electrode 50 is injected through the hole 202 in fluid form until the fluid composition fills the reservoir 208 and the junction structure 210 to the narrow opening of the junction 217. This can be followed by a curing process (e.g., by exposure to UV) to complete the solidification of the polymeric composition. FIG. 3 illustrates an example flow chart 300 of a process of depositing the fluid composition into the reservoir 208. Specifically, at step 310, an equitransferent salt 302 (e.g., KCl), a polymer 304 (e.g., a UV curable acetate), a triol compound 306 (e.g., glycerol), and a non-ionic surfactant 308 (e.g., lauroyl/myristoyl methyl glucamide) are mixed, without introducing air bubbles, to form a well-homogenized mixture paste 312. In some implementations, the weight ratio of the composition of mixture paste 312 can include 45% to 65% of polymer 304, 30% to 55% of salt 302, 1% to 4% of triol compound 306, and 0.2% to 2% of non-ionic surfactant 308. The fluid composition is used to form the polymeric composition of a solid-state reference electrode in the reservoir 208. At step 314, the mixture paste 312 is transferred to a syringe barrel, and at 316, the mixture paste 312 in the syringe barrel is injected into the reservoir 208 through the hole 202. The filling process is continued until the reservoir 208 and the junction structure 210 is filled to the narrow opening of junction 217. The fluid composition in the reservoir 208 is then cured, for example, using a UV curing process, to form the polymeric composition of a solid-state reference electrode.

The polymeric composition is disposed within the reservoir 208 such that the polymeric composition contacts a metallic electrode. In the example module 200 of FIG. 2, the reservoir 208 includes an island 204 that supports Ag/AgCl electrodes. These can be formed, for example, by drop casting a chloride solution—for example, a 0.2 mole $FeCl_3$ solution—onto two silver pins (e.g., metal electrodes) disposed on the island 204 for a period of time (e.g., ten minutes) followed by washing the two pins with deionized water and air drying to achieve chloridized pins. While the example of FIG. 2 describes an Ag/AgCl electrode, other metallic electrodes coated with solid salts of the corresponding metal may also be used, as described with reference to FIG. 1.

Figure 4A:
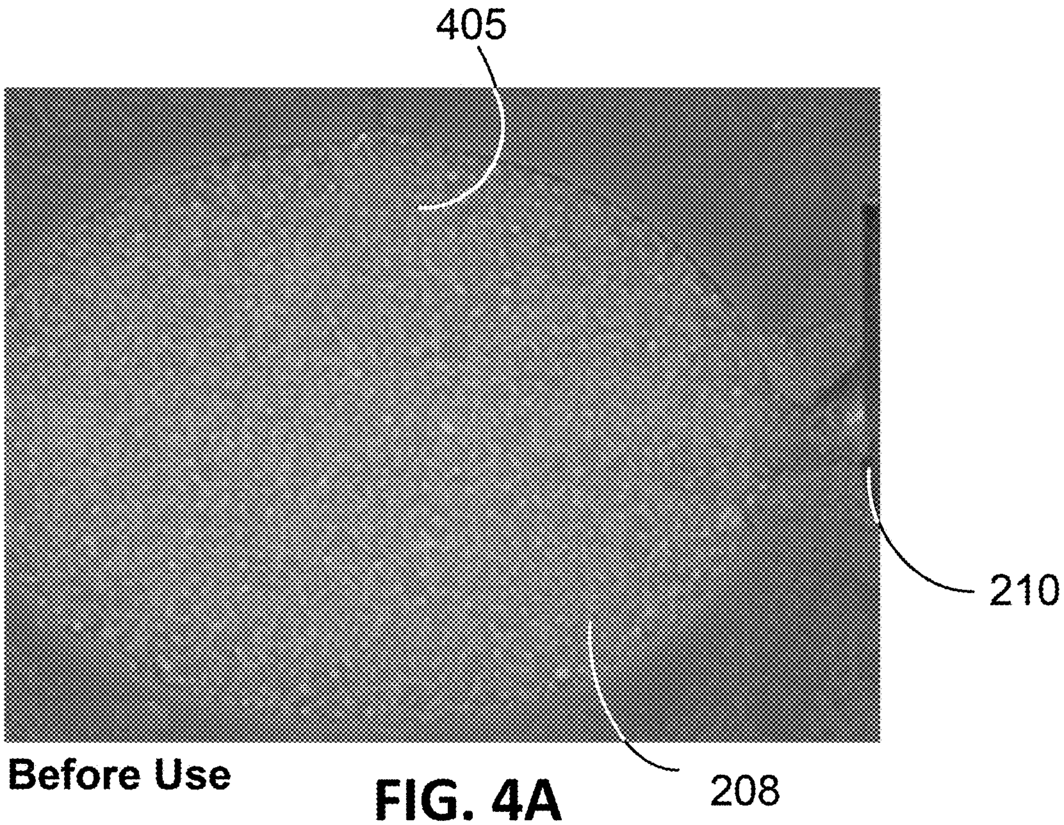
FIGS. 4A and 4B illustrate examples of solid-state reference electrodes implemented using technology described herein, before and after one-month use, respectively
Figure 4B:
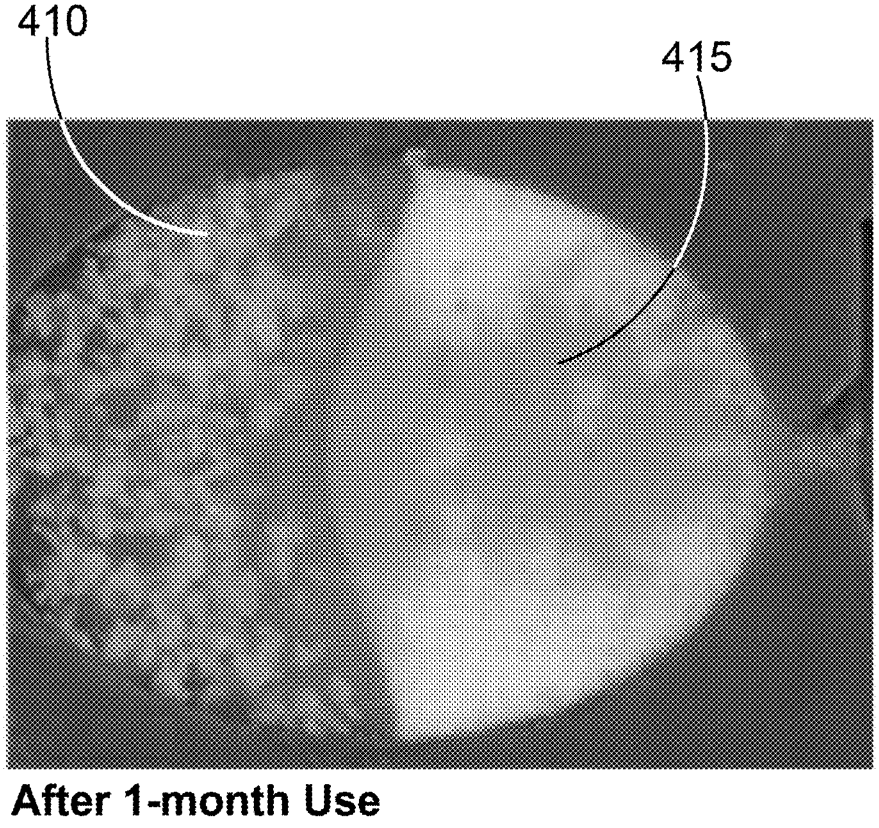

Solid-state reference electrodes implemented using technology described herein provides significantly long use-life. For example, while some solid-state reference electrodes available in the industry have long hydration times (in the order of hours) and/or low use-life (single-use, in some cases), the solid-state reference electrodes described herein can exhibit use-life of over one month while also having low hydration time (in the order of minutes). FIGS. 4A and 4B illustrate the significantly long use-life exhibited by the solid-state reference electrodes described herein. Specifically, FIG. 4A shows a reservoir 208 filled with the polymeric composition before being used as part of a solid-state reference electrode. The dark grey area 405 represents that the polymeric composition has ionic potential available to generate an ionic flux sufficient to provide a stable junction potential at the junction structure 210. As such, FIG. 4A represents that the entirety of the polymeric composition within the reservoir 208 is usable as a part of a solid-state reference electrode. FIG. 4B, on the other hand, illustrates a reservoir 208 filled with the polymeric composition after being used as part of a solid-state reference electrode for one month. In this figure, the light grey area 415 represents portions of the polymeric composition from where the equitransferent salt has been washed out such that the portions cannot supply sufficient ions for maintaining a stable junction potential at the junction structure 210. Therefore, the portions 415 are substantially depleted for the purposes of supporting a reference electrode. However, the dark grey area 410 represents the portions of polymeric composition that continue to have adequate equitransferent salt, and consequently the ability to generate an ionic flux sufficient to provide a stable junction potential at the junction structure 210. Therefore, FIG. 4B illustrates that about half of the polymeric composition in the reservoir 208 continues to be usable to support a reference electrode even after one month of use. In one particular experiment, different solid-state reference electrodes were evaluated after one-month of use-life and each of them showed between half and one-third of the equitransferent salt remaining within the reservoir-thus indicating adequate capacity for even longer use-life. Such high-use-life of the solid-state reference electrodes realized using the technology described herein—together with the low implementation costs and reproducibility of the electrodes—makes these reference electrodes attractive for use in a variety of clinical and industrial applications.

Figure 5:
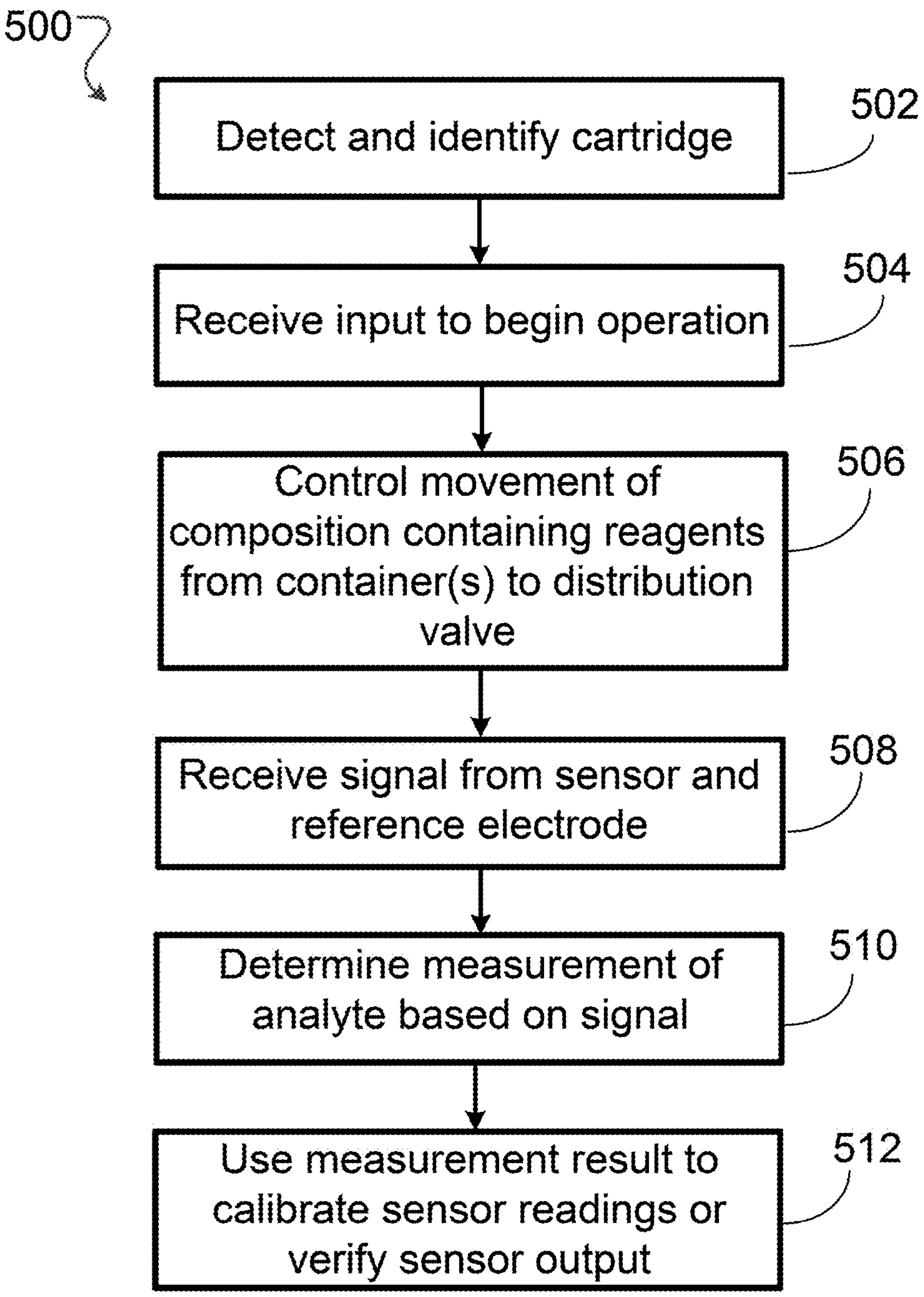
FIG. 5 is a flow chart of an example sequence of operations for measuring analytes in a fluid sample using solid-state reference electrodes described herein.

FIG. 5 illustrates a flow chart 500 of an example set of operations associated with measuring one or more analytes using an electrochemical measurement device that includes a solid-state reference electrode implemented using technology described herein. At least a portion of the process 500 can be executed by the control system 22 described with reference to FIG. 1. The description below references both FIG. 5 and FIG. 1. At 502, the control system 22 detects and identifies a cartridge 23 inserted in the slot 24 of the analyzer or electrochemical measurement device 20 for the purpose of analyzing fluid samples. At 504, the control system 22 receives input to begin operation, for example, via a user-interface associated with the analyzer 20. In some implementations, the control system 22 can be configured to control (at 506) the movement of composition containing reagents from the one or more containers 30*a* to 30*d* to the distribution valve 34. The control system 22 can also be configured to receive (at 508), signals from the one or more sensors 21 and the reference electrode 50. Based on the signals received from the sensors, as well as the reference potential signal received from the solid-state reference electrode 50, the control system 22 determines (at 510) a measurement indicative of the quantity of one or more analytes in the fluid sample being tested. At 512, control system 22 uses the measurement result determined at 510 to calibrate readings or verify results from the one or more sensors 21.

Figure 6:
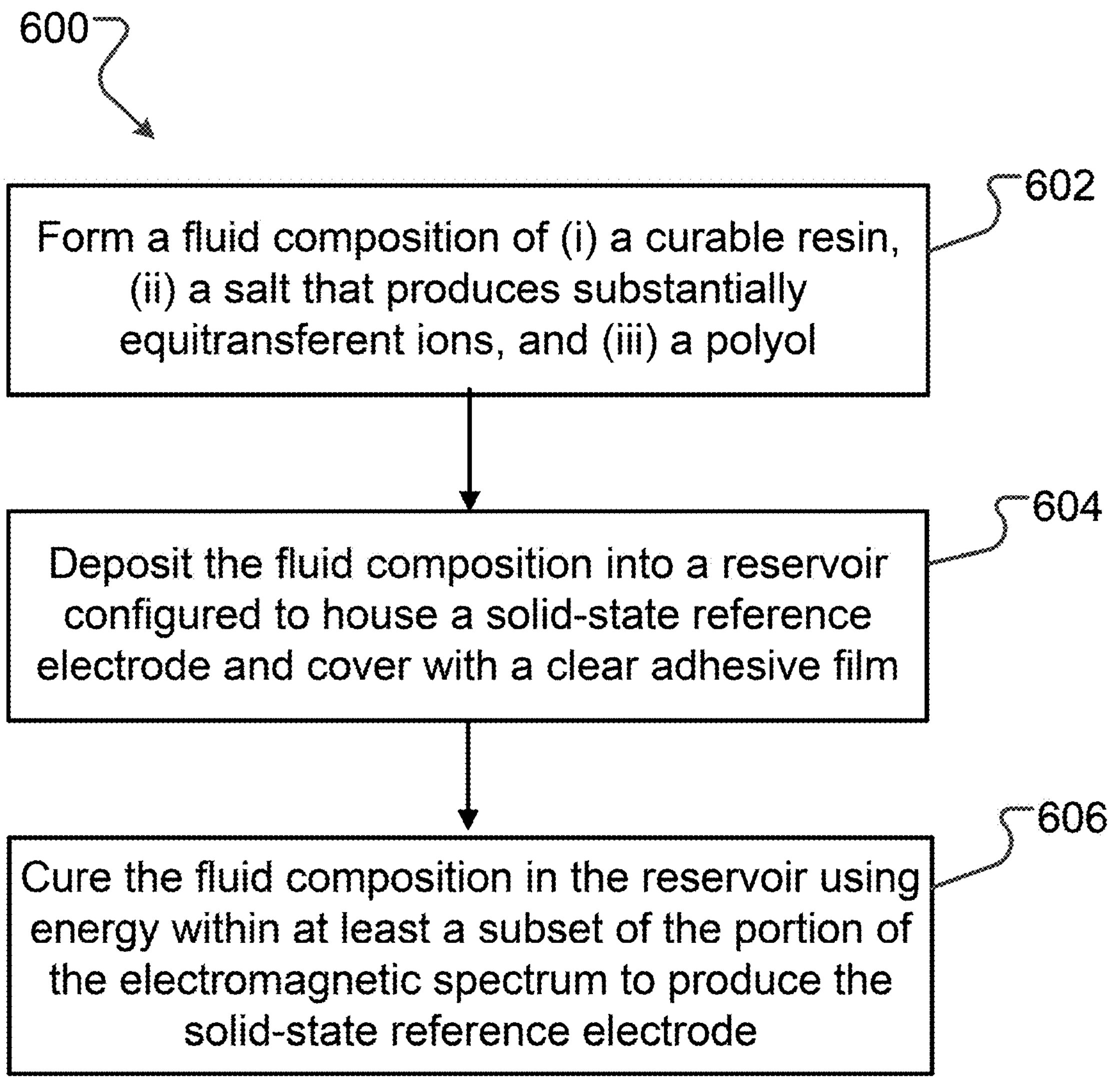
FIG. 6 illustrates a flow chart of an example fabrication process for the solid-state reference electrodes described herein.

FIG. 6 is a flowchart showing an example process 600 for fabricating a solid-state reference electrode described herein. In some implementations, portions of the process 600 can be executed/controlled by one or more processing devices executing a computer-aided manufacturing (CAM) process. The process 600 includes forming (at 602), a fluid composition that includes (i) a curable resin such as a polymer that is polymerizable thermally or exhibits change in structural property upon exposure to at least a portion of the electromagnetic spectrum, (ii) a salt that produces substantially equitransferent ions, and (iii) a polyol such as triol. Each of these components can be of various types as discussed above with reference to FIG. 1. In some implementations, the proportions at which these components are mixed with each other are controlled using the CAM process controlling automated dispensing equipment dispensing one or more of the components. In some implementations, a CAM process can be used to control a mixer that mixes together the above components to form the fluid composition.

At 604, the fluid composition is deposited into a reservoir configured to house a solid-state reference electrode and covered with a clear adhesive film. In some implementations, the step 604 can include portions of the process 300 described above with reference to FIG. 3. In some implementations, a CAM process can be used to control a syringe and/or dispenser that injects the fluid composition into a reservoir. At 606, the fluid composition in the reservoir is cured using energy within at least a subset of the portion of the electromagnetic spectrum to produce the solid-state reference electrode. In some implementations, this includes controlling an UV source to expose the fluid composition in the reservoir for a period of time.

Figure 7:
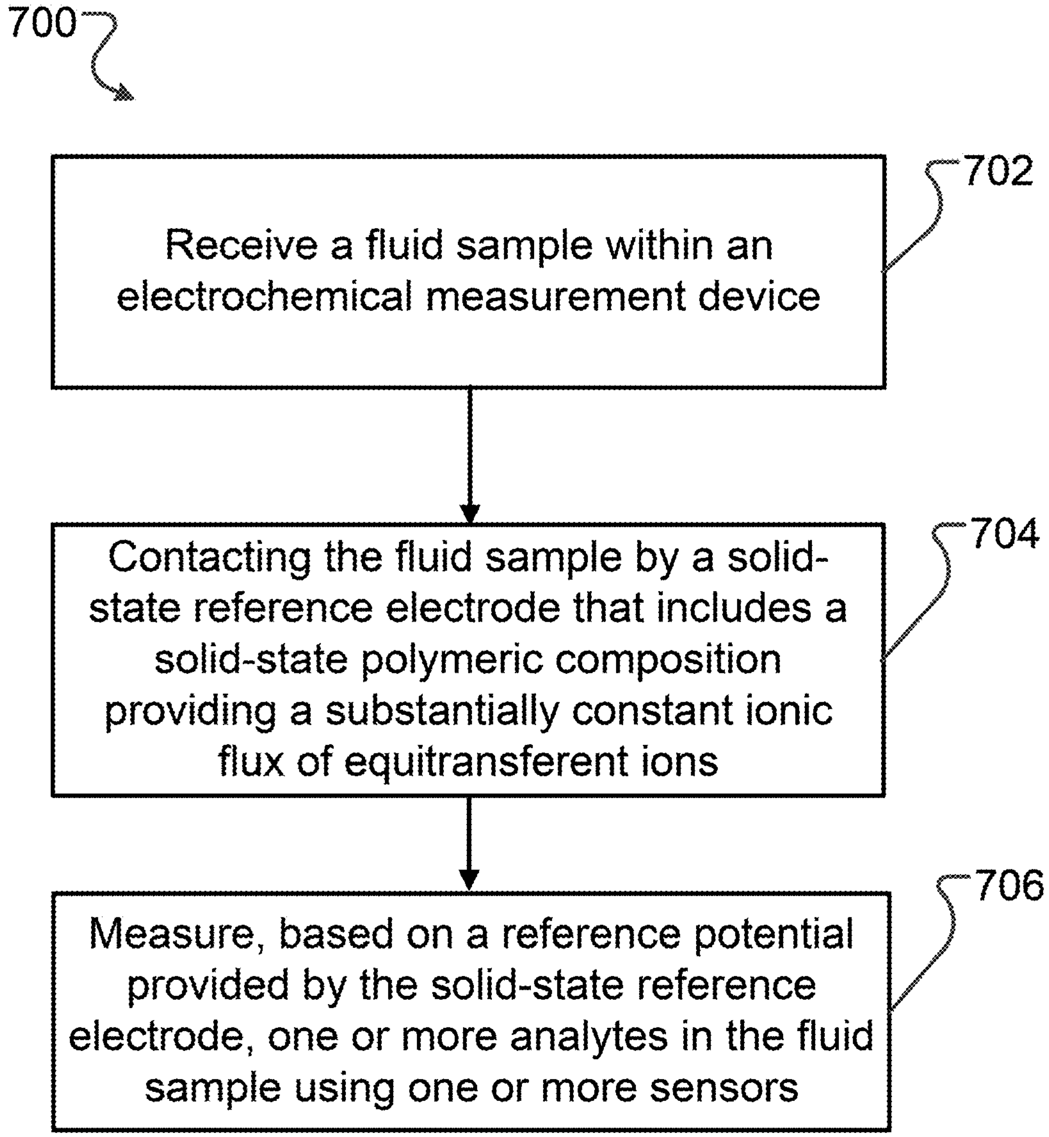
FIG. 7 illustrates a flow chart of an example process of using a solid-state reference electrode described herein.

FIG. 7 illustrates an example process 700 of using a solid-state reference electrode to measure one or more analytes in a fluid sample. The process 700 can include, for example, receiving a fluid sample within an electrochemical measurement device such as the analyzer 20 described above with reference to FIG. 1 (702). The fluid sample can include, for example, blood, plasma, or another aqueous solution that includes one or more analytes to be detected/quantified by the electrochemical measurement device.

The process 700 also includes contacting the fluid sample by a solid-state reference electrode that includes a solid-state polymeric composition providing a substantially constant ionic flux of equitransferent ions (704). The solid-state reference electrode can be of various types as discussed above with reference to FIG. 1. The fluid sample is contacted by the solid-state reference electrode at a junction structure disposed between (i) a flow path of the fluid sample and (ii) a reservoir housing a solid-state polymeric composition configured to support the solid-state reference electrode. The solid-state polymeric composition can include a solidified mix of a cured resin, a salt that produces the substantially equitransferent ions, and a polyol that facilitates ionic mobility within the solid-state polymeric composition. The curable resin, the salt, and the polyol compound—and the solid-state polymeric composition in general—can be substantially similar to as described above with reference to FIG. 1.

The process 700 further includes measuring, using one or more sensors and based on a reference potential provided at the junction structure by the solid-state reference electrode, the one or more analytes in the fluid sample (706). The one or more sensors can be substantially similar to the sensors 21 described above with reference to FIG. 1. Correspondingly, the measurements can be made substantially as described above with reference to FIG. 1.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 22 of FIG. 1. Examples of communication networks include a LAN, a WAN, and the Internet.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the term "substantially" is intended allow for a degree of variability in a value or range, for example, within 10%, within 5%, or within 1% of a stated value or of a stated limit of a range.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A solid-state reference electrode comprising:
a conductor element comprising a metal and a coating comprising a solid salt of the metal; and
a solid-state polymeric composition disposed in contact with the conductor element, the solid-state polymeric composition comprising a solidified mix of:
a cured resin,
a salt that produces substantially equitransferent ions,
a polyol that facilitates ionic conductivity within the solid-sate polymeric composition, and
a non-ionic surfactant;
wherein the solid-state polymeric composition comprises 45-65% by weight of the cured resin and 30-55% by weight of the salt.

2. The solid-state reference electrode of claim 1, wherein the cured resin comprises a polyacrylate.

3. The solid-state reference electrode of claim 1, wherein the salt comprises potassium chloride (KCl).

4. The solid-state reference electrode of claim 1, wherein the solidified mix further comprises a secondary salt that reduces effects of erythrocytes on a junction potential between the solid-state reference electrode and a sample in the electrochemical analyzer.

5. The solid-state reference electrode of claim 4, wherein the secondary salt is an equitransferent salt of sodium comprising at least one of: sodium acetate, sodium bicarbonate, or sodium formate.

6. The solid-state reference electrode of claim 1, wherein the polyol is a triol compound.

7. The solid-state reference electrode of claim 6, wherein the triol compound comprises glycerol.

8. The solid-state reference electrode of claim 1, wherein the solid-state polymeric composition comprises 1-4% of the polyol and 0.2-2% of the non-ionic surfactant.

9. The solid-state reference electrode of claim 1, wherein the metal is silver (Ag).

10. The solid-state reference electrode of claim 9, wherein the solid salt of the metal is silver chloride (AgCl).

11. The solid-state reference electrode of claim 1, wherein the non-ionic surfactant comprises lauroyl/myristoyl methyl glucamide.

12. A solid-state reference electrode comprising:
a conductor element comprising a metal and a coating comprising a solid salt of the metal; and
a solid-state polymeric composition disposed in contact with the conductor element, the solid-state polymeric composition comprising a solidified mix of:
a polymer,
a salt that produces substantially equitransferent ions,
a polyol that facilitates ionic conductivity within the solid-state polymeric composition; and
a non-ionic surfactant comprising lauroyl/myristoyl methyl glucamide.

13. A module for an electrochemical analyzer, the module comprising:
a flow path configured to receive a fluid sample, the flow path comprising a channel containing sensors to detect analytes in the fluid sample;
a solid-state reference comprising a reservoir containing a solid-state-polymeric composition; and
a junction structure disposed between the reservoir and the flow path, the junction structure being configured to allow the fluid sample to come into contact with the solid-state polymeric composition, the junction structure having an input that intersects the channel and an output that intersects the reservoir, with a cross-section of the junction structure increasing progressively from the input to the output.

14. The module of claim 13, wherein the reservoir has an ellipsoid shape to facilitate substantially constant ion flux between the fluid sample and the solid-state polymeric composition.

15. The module of claim 13, wherein the junction structure comprises:
a first opening at an interface of the reservoir and the junction structure; and
a second opening at an interface of the flow path and the junction structure;
wherein:
a size of the first opening is larger than a size of the second opening; and
the junction structure has a funnel shape.

16. The module of claim 13, wherein the module further comprises one or more sensors disposed in the flow path to measure one or more analytes in the fluid sample.

17. A method for use in a process for fabricating the module of claim 13, the method comprising:
forming a fluid composition of (i) a polymer, (ii) a salt that produces substantially equitransferent ions, and (iii) a polyol
depositing the fluid composition into the reservoir; and
curing the fluid composition.

18. The module of claim 13, wherein the solid-state polymeric composition comprises non-ionic surfactant comprising lauroyl/myristoyl methyl glucamide.

19. A method for analyzing fluid samples, comprising:
receiving a fluid sample within an electrochemical measurement device;
contacting the fluid sample by a solid-state reference electrode for the electrochemical measurement device through a junction structure disposed between (i) a flow path of the fluid sample, the flow path comprising a channel containing one or more sensors to detect analytes in the fluid sample, and (ii) a reservoir housing a solid-state polymeric composition configured to support the solid-state reference electrode, wherein the solid-state polymeric composition is configured to provide a substantially constant ionic flux of substantially equitransferent ions through the junction structure, and wherein the junction structure has an input that intersects the channel and an output that intersects the reservoir, with a cross-section of the junction structure increasing progressively from the input to the output so that the junction structure allows the fluid sample to come into contact with the solid-state reference electrode; and
measuring one or more analytes in the fluid sample using the one or more sensors, wherein the measuring is performed based on a reference potential provided by the solid-state reference electrode;
wherein the solid-state polymeric composition comprises a solidified mix of:

a polymer, a salt that produces the substantially equitransferent ions, and a polyol that facilitates substantially constant ionic mobility within the solid-state-polymeric composition.

20. The method of claim 19, wherein the solid-state polymeric composition comprises non-ionic surfactant comprising lauroyl/myristoyl methyl glucamide.

* * * * *